Patented Mar. 10, 1931

1,796,018

UNITED STATES PATENT OFFICE

HAROLD GRAY, OF AKRON, OHIO, ASSIGNOR TO THE B. F. GOODRICH COMPANY, OF NEW YORK, N. Y., A CORPORATION OF NEW YORK

COMPOSITION OF MATTER AND METHOD OF PRODUCING SAME

No Drawing.   Application filed July 31, 1926.   Serial No. 126,341.

This invention relates to the vulcanization of rubber and similar materials and has for a primary object to provide a process for the vulcanization of rubber by the aid of accelerators formed by heat treatment of aliphatic aldehydes with relatively small amounts of organic amines, as well as ammonia. A further object is to provide a new class of organic accelerators having a comparatively low nitrogen content which will be relatively free from low temperature curing, as shown by "air curing" or scorching during factory processing of the uncured rubber mixes, but which will cause rapid vulcanization at ordinary vulcanizing temperatures.

It is known that alkalies, such as sodium or potassium hydroxides, will change acetaldehyde to aldol, butyric aldehyde to parabutyl-aldehyde, and in general change aldehydes to higher boiling products. Products such as para-butyl-aldehyde have been proposed as accelerators for the vulcanization of rubber or otherwise described as having a valuable effect on the physical properties of the vulcanizate.

I am also aware that aldehydes are known to react with the well-known aldehyde-amines, produced by the action of one mol of aldehyde on one mol of primary amine, to provide accelerators of vulcanization comprising ultimately the reaction product of three mols of aldehyde on two mols of amine. Such products are formed by preparing first the original aldehyde-amine and then by the aid of heat and the addition of more aldehyde to cause a further reaction.

I now find that when a small amount of an amine, such as aniline, benzylamine, n-butylamine, or even ammonia, is added to a liquid aliphatic aldehyde and the mixture is heated under a reflux condenser for several hours, a large amount of the aldehyde is condensed, polymerized, or otherwise rendered high boiling and, after distillation of unchanged aldehyde, if any, the resulting product is found to correspond to a reaction product of one mol of amine to several mols of aldehyde. The exact nature of these products is not known, and they are therefore for convenience referred to herein as "condensation products."

Furthermore, I find that the preparation of these condensation products having a large amount of aldehyde combined with a small amount of amine may be carried out in the presence or in the absence of acids and acidic substances. The presence of a small proportion of acidic substances in the reaction mixture facilitates the condensation reaction and results ordinarily in a condensation product of somewhat higher accelerating value than these condensation products made from aldehydes and amines without the presence of acids. Commercial aldehydes normally contain a small percent of free acids, ranging approximately from 0.5 to 3 percent, and it has been observed that the amount of free acids normally present in commercial aldehydes is generally sufficient to give condensation products of maximum accelerating value. Although a reaction mixture of aldehyde and amine containing from 0.5 to 3 percent of acids, based on the aldehyde, is ordinarily preferred for the preparation of these condensation products, it has been found that reaction mixtures containing both lower and higher percents of acid produce condensation products of high accelerating value.

The relative accelerating value of condensation products of an aldehyde and an amine made in the presence and in the absence of acids is illustrated by the following experiment:

*Example 1.*—One mol of p-amino-dimethylaniline was caused to react with 2 mols of n-butyric aldehyde, (*a*) in the absence of acids and (*b*) in the presence of acidic substances having an acid equivalent of 2.8 percent butyric acid based on the aldehyde. Each of the two condensation products was compounded into a rubber mix comprising rubber—100, zinc oxide—10, sulfur—5, and condensation product—0.4 parts by weight. All cures were at 286° F. In the results tabulated below, the tensile strengths (T) are given in pounds per square inch, and the elongations (E) in percent:

| Condensation product made | Cure in minutes | | | | | |
|---|---|---|---|---|---|---|
| | 15 | | 30 | | 60 | |
| | T | E | T | E | T | E |
| (a) Without acid | 1230 | 950 | 2260 | 860 | 2740 | 775 |
| (b) With acid | 3260 | 881 | 3621 | 775 | 4450 | 750 |

Similar improved accelerating value of the acid condensates of aldehyde-amines over the non-acid condensates was also observed for other molecular proportions of the above aldehyde and amine condensation product, and also for other aldehyde-amine condensation products. The character of the acidic substances employed in the reaction mixture seems to be of no great consequence, although the organic acids have been found to be preferable to the stronger mineral acids.

It is also observed that the condensation products comprising two or more mols of aliphatic aldehyde reacted with one mol of an amine excel in accelerating activity the aldehyde-amines heretofore employed as accelerators for the vulcanization of rubber, as is evidenced by shorter cures and higher tensile strengths of the vulcanizates. Starting with the reaction product of one mol of aldehyde and one mol of amine and increasing the aldehyde in steps of one mol each up to 4, and in some cases up to 8, mols of the aldehyde, and compounding the products weight for weight in a given formula, it is observed that whereas the nitrogen content, or content of original amine, grows proportionately less and less in the reaction product, yet the accelerating effect on the reaction prodct increases as the ratio of aldehyde to amine increases. This is shown by the two following experiments.

*Example 2.*—One mol of p-amino-dimethylaniline was caused to react respectively with 1, 1.6, 2 and 4 mols of commercial n-butyric aldehyde showing on analysis a free acid content equivalent to 2.8 percent of butyric acid. Each of the four products were compounded into a rubber mix comprising rubber—100, zinc oxide—10, sulfur—5, and condensation product—0.4 parts by weight. All cures were at 286° F. In the results tabulated below, the tensile strengths (T) are given in pounds per square inch, and the elongations (E) in percent.

| Mols aldehyde per mol amine | Cure in minutes | | | | | |
|---|---|---|---|---|---|---|
| | 15 | | 30 | | 60 | |
| | T | E | T | E | T | E |
| 1 | 1370 | 913 | 2510 | 838 | 3520 | 783 |
| 1.6 | 1870 | 881 | 3410 | 831 | 3770 | 733 |
| 2 | 3260 | 881 | 3620 | 775 | 4450 | 750 |
| 4 | 4490 | 788 | 4840 | 725 | 3780 | 663 |

*Example 3.*—One mol of p-amino-dimethylaniline was caused to react respectively with 1, 4, 5 and 8 mols of commercial n-butyric aldehyde as above described. Each of the four products were compounded into a rubber mix comprising rubber—100, zinc oxide—10, sulfur—5, and condensation product—0.5 parts by weight. All cures were 20 minutes at 287° F.

| Mols aldehyde per mol amine | Tensile strength in lbs. per sq. in. | Elongation in percent |
|---|---|---|
| 1 | 3420 | 713 |
| 4 | 4330 | 694 |
| 5 | 4450 | 719 |
| 8 | 4670 | 750 |

In preparing products having a high ratio of aldehyde to amine, it is frequently desirable to use an excess of aldehyde during the reaction and to remove the excess of aldehyde by distillation, as by heating the reaction mixture to a temperature somewhat higher than the boiling point of aldehyde employed.

*Example 4.*—As a further example of a method of preparation of these accelerators, 107 g. of commercial n-butyric aldehyde were mixed with 18 g. of n-butylamine. This is substantially in the ratio of 6 mols of aldehyde to 1 mol of amine. A violent reaction took place and the liquid boiled. When the reaction had subsided, the mixture was heated under a reflux condenser for from 1 to 2 hours or until the reflux of unchanged aldehyde had disappeared. The mixture was then allowed to cool and settle. The lower layer of water was removed and the upper layer dried by gentle heating in an open container. One half of one part by weight of the product in the above formula produced a product having a tensile strength of about 4400 pounds per square inch, when cured for 15 minutes at 287° F. in a press.

Di-n-butylamine and tri-n-butylamine when employed in the above example exert a similar effect in reaction with a large amount of butyric aldehyde to produce a condensation product, which products, however, do not give to the vulcanizates prepared according to the same formula as high tensile strengths. This lower accelerating action is also observed with other aliphatic aldehydes treated with other secondary or tertiary amines.

*Example 5.*—One mol of aniline was caused to react respectively with 1, 2, 3 and 6 mols of commercial butyric aldehyde, a greater excess of aldehyde being used with the higher ratios and the excess removed by distillation. The relative curing action of the four products was shown by using 0.5 parts by weight in the formula of Example 3 and curing for 20 minutes at 287° F.

| Mols aldehyde per mol amine | Tensile strength in lbs. per sq. in. | Elongation in percent |
|---|---|---|
| 1 | 2000 | 940 |
| 2 | 3280 | 806 |
| 3 | 3960 | 794 |
| 6 | 4270 | 725 |

*Example 6.*—One mol (87 parts by weight) of isoamylamine was added to 15 mols (1080 parts) of purified butyric aldehyde and the mixture heated under a reflux condenser on the steam bath for 20 hours 163 parts by weight of water separated out and was removed. The non-aqueous layer was then distilled up to 150° C. in the liquid whereby 2 parts of water and 12 parts of organic liquid were removed. The residue, weighing 938 parts by weight was found to correspond to the reaction product of 14 mols of butyric aldehyde and 1 mol of isoamylamine. A composition containing this condensation product and comprising rubber—100, zinc oxide—10, sulfur—5 and condensation product—0.5 (parts by weight) showed the following accelerating action in press cures at 287° F.

| Cure in minutes | Tensile strength in lbs. per sq. in. | Elongation in percent |
|---|---|---|
| 15 | 2500 | 850 |
| 20 | 2850 | 825 |
| 40 | 3810 | 775 |
| 60 | 3785 | 750 |

Accelerators having higher ratios of aldehyde to amine than that indicated above may be obtained by the process hereinabove described, a reaction product having an aldehyde-amine ratio of 26 mols of aldehyde to 1 mol of amine and possessing satisfactory accelerating powers having been prepared and tested. Numerous tests of the efficacy of these accelerators seems to indicate that the condensation products having a maximum accelerating value have an aldehyde-amine ratio ranging from 4–8 mols of aldehyde to 1 mol of amine, varying with the aldehyde and amine employed, the accelerating value dropping off slowly from a maximum as the aldehyde-amine ratio is further increased.

It is also observed that mixtures of different aliphatic aldehydes react with an organic amine, or ammonia, to form condensation products having desirable accelerating values for certain purposes. The following example is illustrative of such a condensation product:

*Example 7.*—Three mols of commercial butyric aldehyde (1080 parts by weight) was mixed with one mol of commercial aldol (440 parts) and one mol of aniline (465 parts) was added thereto. The product was stirred and then heated under a reflux condenser for about ten hours. The product was allowed to cool and then heated to 140° C. in the liquid, whereby water and some organic liquid was distilled off, the liquid residue comprising the condensation product amounting to approximately 1420 parts by weight. A rubber composition containing this condensation product and comprising rubber—100, zinc oxide—10, sulfur—5, and condensation product—0.5 (parts by weight) show the following accelerating action in press cures at 287° F.

| Cure in minutes | Tensile strength in pounds per sq.in. | Elongation in percent |
|---|---|---|
| 30 | 3270 | 750 |
| 60 | 3430 | 700 |
| 90 | 3710 | 638 |

While the specific examples above given recite accelerators prepared from butyric aldehyde, it is to be understood that other aldehydes may be employed. Heptaldehyde and iso-butyric aldehyde have been found to produce condensation products having accelerating values substantially equal to those prepared from butyric aldehyde. Cinnamic aldehyde, croton aldehyde, and aldol may also be used in place of butyric aldehyde, although saturated aliphatic aldehydes are preferred. The condensation of amines with low boiling aldehydes may be carried out under pressure, and this procedure may be substituted with respect to other aldehydes in place of the above described treatment under a reflux condenser. Amines either aliphatic or aromatic are operative in the preparation of the accelerators of this application, and ammonia itself gives desirable products.

This application is in part a continuation of my copending application Serial No. 66,868, filed November 4, 1925, and entitled "Process for vulcanizing rubber and products obtained thereby".

I claim:

1. The process of vulcanizing rubber which comprises treating rubber under vulcanizing conditions with vulcanizing agents and a product resulting from the interaction of one mol of organic amine, or ammonia, and three or more mols of aliphatic aldehyde.

2. The process of vulcanizing rubber which comprises treating rubber under vulcanizing conditions with vulcanizing agents and a product resulting from the interaction of one mol of primary organic amine and from three to ten mols of an aliphatic aldehyde having a plurality of carbon atoms.

3. The process of vulcanizing rubber which comprises treating rubber under vulcanizing conditions with vulcanizing agents and a product resulting from the interaction carried out under reflux of not less than three mols of liquid aliphatic aldehyde and one mol of primary organic amine.

4. The process of vulcanizing rubber which comprises combining with rubber vulcanizing agents and an accelerator resulting from the interaction of one mol of organic amine and three or more mols of n-butyric aldehyde.

5. The process of vulcanizing rubber which consists in incorporating into a vulcanizable rubber mix a product resulting from the interaction of not less than three mols of butyric aldehyde and one mol of aniline.

6. The process of vulcanizing rubber which comprises treating a rubber mix under vulcanizing conditions with vulcanizing agents and a product resulting from the interaction in the presence of acid of one mol of organic amine, or ammonia, and three or more mols of aliphatic aldehyde.

7. The process of vulcanizing rubber which comprises treating a rubber mix under vulcanization conditions with vulcanizing agents and a product resulting from the interaction in the presence of organic acid of one mol of organic amine and three or more mols of liquid aliphatic aldehyde.

8. The process of vulcanizing rubber which comprises combining with rubber vulcanizing agents and an accelerator produced by the interaction of one mol of organic amine and three or more mols of commercial butyric aldehyde having a relatively small free acid content.

9. The process of vulcanizing rubber which comprises combining with rubber vulcanizing agents and an accelerator produced by the interaction in the presence of organic acid of one mol of organic amine and three or more mols of butyric aldehyde, the amount of acid being equivalent to from 0.5 to 3 percent of butyric acid based on the aldehyde.

10. The process of vulcanizing rubber which consists in incorporating into a vulcanizable rubber mix a product resulting from the interaction in the presence of organic acid of not less than 3 mols of butyric aldehyde and one mol of aniline.

11. The process of vulcanizing rubber which consists in incorporating into a vulcanizable rubber mix a product resulting from the interaction of not less than 3 mols of commercial butyric aldehyde and one mol of aniline, the aldehyde containing free acid in the proportions normally present in commercial butyric aldehyde.

12. The process of vulcanizing rubber which consists in incorporating into a vulcanizable rubber mix a product resulting from the interaction in the presence of an acid of not less than three mols of mixed aliphatic aldehydes and one mol of organic amine.

13. A vulcanized rubber compound containing before vulcanization a product resulting from the interaction of one mol of organic amine, or ammonia, and three or more mols of aliphatic aldehyde.

14. A composition of matter comprising rubber combined with vulcanizing agents and a product resulting from the interaction of one mol of organic amine and three to ten mols of liquid aliphatic aldehyde.

15. A composition of matter comprising rubber combined with vulcanizing agents and an accelerator resulting from the interaction under a reflux condenser of one mol of organic amine and three or more mols of butyric aldehyde.

16. A vulcanized rubber compound containing before vulcanization an accelerator resulting from the interaction of not less than three mols of butyric aldehyde and one mol of aniline.

17. A vulcanized rubber product containing before vulcanizing a product resulting from the interaction in the presence of an acid of one mol of organic amine and three or more mols of aliphatic aldehyde.

18. A composition of matter comprising rubber combined with vulcanizing agents and a product resulting from the interaction in the presence of an acid of one mol of organic amine and three to ten mols of liquid aliphatic aldehyde.

19. A vulcanized rubber compound containing before vulcanization an accelerator formed by the interaction in the presence of an acid of not less than three mols of liquid aliphatic aldehyde and one mol of aniline.

20. A vulcanized rubber compound containing before vulcanization an accelerator formed by the interaction of not less than three mols of commercial butyric aldehyde and one mol of aniline.

21. A vulcanized rubber compound containing before vulcanization an accelerator formed by the interaction of not less than three mols of mixed aliphatic aldehydes and one mol of organic amine.

22. A composition of matter comprising a condensation product formed by the interaction in the presence of an acid of two or more mols of aliphatic aldehyde and one mol of organic amine, or ammonia.

23. A composition of matter comprising a condensation product formed by the interaction in the presence of an acid of not less than three mols of liquid aliphatic aldehyde and one mol of organic amine.

24. A composition of matter comprising a condensation product formed by the interaction in the presence of an acid of not less than three mols of liquid aliphatic aldehyde and one mol of aniline.

25. A composition of matter comprising a condensation product formed by the interaction in the presence of an acid of not less than three mols of butyric aldehyde and one mol of organic amine.

26. A composition of matter comprising a condensation product formed by the interaction in the presence of an acid of not less than three mols of butyric aldeyde and one mol of aniline.

27. A composition of matter comprising a condensation product formed by the interaction in the presence of an acid of three or more mols of mixed aliphatic aldehydes and one mol of organic amine, or ammonia.

28. The method of vulcanizing rubber which comprises heating a mixture of rubber and sulphur in the presence of a reaction product of substantially one molecular proportion of aniline with substantially three molecular proportions of butyraldehyde.

29. The method of vulcanizing rubber which comprises heating a mixture of rubber and sulphur in the presence of the substantially dehydrated and heat treated reaction product of approximately one molecular proportion of aniline with approximately three molecular proportions of butyraldehyde.

30. The process of vulcanizing rubber substances which consists in mixing with the rubber substances vulcanizing ingredients and an aldehyde-amine ($n:1$) in which $n$ is at least 2 and in which the amine is a primary amine and the aldehyde an alpha-beta saturated aldehyde, and heating to the vulcanization temperature.

31. The process of vulcanizing rubber substances which consists in mixing with the rubber substances vulcanizing ingredients and an aldehyde-amine ($n:1$) in which $n$ is 3 to 7, and in which the amine is a primary amine and the aldehyde an alpha-beta saturated aldehyde and heating to the vulcanization temperature.

32. The process of vulcanizing rubber substances which consists in mixing with the rubber substances vulcanizing ingredients and an aldehyde-amine ($n:1$) in which $n$ is at least 2 and in which the amine is a primary amine and the aldehyde n-butyraldehyde and heating to the vulcanization temperature.

33. The process of vulcanizing rubber substances which consists in mixing with the rubber substances vulcanizing ingredients and an aldehyde-amine ($n:1$) in which $n$ is 3 to 7, the amine a primary amine and the aldehyde n-butyraldehyde and heating to the vulcanization temperature.

34. The process of vulcanizing rubber substances which consists in mixing with the rubber substances vulcanizing ingredients and n-butyraldehyde-aniline ($n:1$) in which $n$ is at least 2 and heating to the vulcanization temperature.

35. The process of vulcanizing rubber substances which consists in mixing with the rubber substances vulcanizing ingredients and n-butyraldehyde-aniline ($n:1$) in which $n$ is 3 to 7 and heating to the vulcanization temperature.

36. The process of vulcanizing rubber substances which consists in mixing with the rubber substances, vulcanizing ingredients and an aldehyde-amine $Ac$ ($n:1$) prepared in the presence of an acidic condensing agent, in which $n$ is 2 or more, the amine being a primary amine and the aldehyde an alpha-beta saturated aldehyde, and heating to effect vulcanization.

37. The process of vulcanizing rubber substances which consists in mixing with the rubber substances vulcanizing ingredients and an aldehyde-amine $Ac$ ($n:1$) prepared in the presence of an organic acid, in which $n$ is 2 to 7, the amine a primary amine and the aldehyde an alpha-beta saturated aldehyde, and heating to effect vulcanization.

38. The process of vulcanizing rubber substances which consists in mixing with the rubber substances vulcanizing ingredients and n-butyraldehyde-aniline $Ac$ ($n:1$) prepared in the presence of an organic acid, in which $n$ is 2 or more, and heating to effect vulcanization.

39. The process of vulcanizing rubber substances which consists in mixing with the rubber substances vulcanizing ingredients and n-butyraldehyde-aniline $Ac$ ($n:1$) prepared in the presence of an organic acid, in which $n$ is 2 to 7, and heating to effect vulcanization.

40. The method of vulcanizing rubber which comprises heating a mixture of rubber and sulfur in the presence of the product of an aliphatic aldehyde and a primary amine, substantially in the proportion three to one, reacted in the presence of an acid.

41. The method of vulcanizing rubber which comprises heating a mixture of rubber and sulfur in the presence of the product of an aliphatic aldehyde and a primary amine, substantially in the proportion three to one, reacted in the presence of an organic acid containing from four to ten carbon atoms.

42. Process for the production of condensation products of aldehydes and amino bodies in which the molecular ratio of aldehyde to amine is greater than 2 to 1, which comprises causing one molecular proportion of an amino body to react directly with at least three molecular proportions of an aldehyde having more than two carbon atoms in its molecule in the presence of an acidic condensing agent.

43. Process for the production of condensation products of aldehydes and amino bodies in which the molecular ratio of aldehyde to amine is greater than 2 to 1, which comprises causing one molecular proportion of a primary amine to react directly with at least three molecular proportions of an aliphatic aldehyde having more than two carbon atoms in its molecule in the presence of an acid.

44. Process for the production of condensation products of aldehydes and amino bodies in which the molecular ratio of aldehyde to amine is greater than 2 to 1, which comprises causing one molecular proportion of a primary amine to react directly with at least three molecular proportions of an aliphatic aldehyde having more than two carbon atoms in its molecule in the presence of an organic acid.

45. Process for the production of condensation products of aldehydes and amino bodies in which the molecular ratio of aldehyde to amine is greater than 2 to 1, which comprises causing one molecular proportion of a primary amine to react directly with from 3 to 7 molecular proportions of an aliphatic aldehyde having more than two carbon atoms in its molecule in the presence of an organic acid.

46. Process for the production of condensation products of aldehydes and amino bodies in which the molecular ratio of aldehydes to amine is greater than 2 to 1, which comprises causing one molecular proportion of a primary amine to react directly with about five molecular proportions of an alpha-beta saturated aldehyde in the presence of an organic acid.

47. Process for the production of condensation products of aldehydes and amino bodies in which the molecular ratio of aldehyde to amine is greater than 2 to 1, which comprises causing one molecular proportion of a primary amine to react directly with about five molecular proportions of butyraldehyde in the presence of an organic acid.

48. Process for the production of condensation products of aldehydes and amino bodies in which the molecular ratio of aldehyde to amine is greater than 2 to 1, which comprises causing one molecular proportion of aniline to react directly with about five molecular proportions of butyraldehyde in the presence of an organic acid.

49. The process of condensing aldehydes with amino bodies, which consists in causing one molecular proportion of an amino body to react with from three to seven molecular proportions of an aliphatic aldehyde having a plurality of carbon atoms in the molecule under conditions whereby water is liberated.

50. The process of condensing aliphatic alpha-beta saturated aldehydes with amino bodies, which consists in causing one molecular proportion of the amino body to react with from three to seven molecular proportions of the aldehyde under conditions whereby water is liberated.

51. Process for the production of aldehyde-amine condensation products in which the ratio of aldehyde to amine is greater than 2 to 1, which comprises causing one molecular proportion of an amino body to react with at least three molecular proportions of an aliphatic aldehyde having more than two carbon atoms in its molecule under conditions whereby water is liberated.

52. Process for the production of aldehyde-amine condensation products in which the ratio of aldehyde to amine is greater than 2 to 1, which comprises causing one molecular proportion of an amino body to react with at least three molecular proportions of an alpha-beta saturated aldehyde having more than two carbon atoms in its molecule under conditions whereby water is liberated.

53. The aldehyde-amine compound obtained by the reaction of one molecular proportion of aromatic primary amine with not less than three molecular proportions of aliphatic aldehyde.

54. The aldehyde-amine reaction product obtained by the reaction of one molecular proportion of aniline with more than three molecular proportions of a single aliphatic aldehyde.

55. A composition of matter comprising the reaction product of aliphatic aldehyde and primary amine, substantially in the molecular proportion of three to one, reacted in the presence of an acid.

56. A composition of matter comprising the reaction product of aliphatic aldehyde and primary amine, substantially in the molecular proportion of three to one, reacted in the presence of an organic acid containing from four to ten carbon atoms.

In witness whereof I have hereunto set my hand this 29th day of July, 1926.

HAROLD GRAY.